US010463016B2

(12) United States Patent
Kfoury

(10) Patent No.: US 10,463,016 B2
(45) Date of Patent: Nov. 5, 2019

(54) UNIVERSAL VENTILATED LITTER BOX ASSEMBLY

(71) Applicant: Toni Kfoury, Huntington Beach, CA (US)

(72) Inventor: Toni Kfoury, Huntington Beach, CA (US)

( * ) Notice: Subject to any disclaimer, the term of this patent is extended or adjusted under 35 U.S.C. 154(b) by 0 days.

(21) Appl. No.: 15/162,197

(22) Filed: May 23, 2016

(65) Prior Publication Data

US 2017/0332597 A1    Nov. 23, 2017

(51) Int. Cl.
*A01K 1/00* (2006.01)
*A01K 1/01* (2006.01)
*A01K 29/00* (2006.01)

(52) U.S. Cl.
CPC .......... *A01K 1/0052* (2013.01); *A01K 1/0047* (2013.01); *A01K 1/0107* (2013.01); *A01K 29/00* (2013.01)

(58) Field of Classification Search
CPC ... A01K 1/0047; A01K 1/0052; A01K 1/0107
See application file for complete search history.

(56) References Cited

U.S. PATENT DOCUMENTS

| | | | |
|---|---|---|---|
| 4,081,915 A * | 4/1978 | Materniak nee Babcerowicz | D06F 58/20 285/9.1 |
| 5,044,325 A * | 9/1991 | Miksitz | A01K 1/0107 119/165 |
| 5,134,972 A * | 8/1992 | Compagnucci | A01K 1/0107 119/165 |
| 5,140,948 A | 8/1992 | Roberts | |
| 5,307,761 A * | 5/1994 | Berger, III | A01K 1/0107 119/165 |
| 5,315,964 A | 5/1994 | Mimms et al. | |
| 5,564,364 A | 10/1996 | Kovacs et al. | |
| 6,176,201 B1 * | 1/2001 | Fields | A01K 1/0107 119/163 |
| 8,297,230 B2 | 10/2012 | Ferrer et al. | |
| 9,504,228 B1 * | 11/2016 | Ciotic | A01K 1/0107 |
| 2002/0127966 A1 * | 9/2002 | Rich | A01K 1/0107 454/341 |
| 2004/0094097 A1 * | 5/2004 | Shartell | A01K 1/0107 119/165 |
| 2006/0156993 A1 * | 7/2006 | Wright | A01K 1/0107 119/165 |

(Continued)

*Primary Examiner* — Ryan A Reis
(74) *Attorney, Agent, or Firm* — Omni Legal Group; Omid E. Khalifeh; Ariana K. Santore

(57) ABSTRACT

The present disclosure is directed to devices and kits configured to displace noxious odors generated by pet waste or excrement from within pet waste receptacles, such as a litter box kept within the pet owner's living space or home to areas existing outside of such owner's living space via a preexisting window therein. More particularly, a flexible, elongated duct is coupled to an exhaust hole in any hooded litter box on one end, and on another end, coupled to an electrically powered fan and universal window vent panel. When the window vent panel is sealedly disposed in a window and the fan is powered on, noxious air within the receptacle is drawn through the exhaust opening in the enclosure, the duct, and an exhaust opening in the window vent panel to an outside of such window.

5 Claims, 3 Drawing Sheets

(56) References Cited

U.S. PATENT DOCUMENTS

2010/0132624 A1\* 6/2010 Ferrer ............... A01K 1/0047
119/500
2011/0048330 A1 3/2011 Matthews \* cited by examiner

UNIVERSAL VENTILATED LITTER BOX ASSEMBLY

GOVERNMENT CONTRACT

Not applicable.

CROSS-REFERENCE TO RELATED APPLICATIONS

Not Applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to devices for containing pet waste and, more particularly, to devices and kits configured to remove noxious smells associated with waste disposed in litter boxes kept indoors.

BACKGROUND

The following is a tabulation of some prior art that presently appears relevant:

U.S. Patents

| Pat. No. | Kind Code | Issue Date | Patentee |
|---|---|---|---|
| 5,044,325 | | Sep. 3, 1991 | Miksitz |
| 5,307,761 | | May 3, 1994 | Berger, III et al. |
| 5,140,948 | | Aug. 25, 1992 | Roberts |
| 5,315,964 | | May 31, 1994 | Mimms et al. |
| 5,564,364 | | Oct. 15, 1996 | Kovacs et al. |
| 8,297,230 | B2 | Oct. 30, 2012 | Ferrer et al. |

U.S. Patent Applications

| Pub. No. | Kind Code | Pub. Date | Applicant |
|---|---|---|---|
| 2011/0048330 | A1 | Mar. 3, 2011 | Mathews |
| 2006/015993 | A1 | Jul. 20, 2006 | Wright |

Foreign Patent Documents

None found.

Non-Patent Literature

None found.

DISCUSSION OF THE RELATED ART

Various systems and apparatuses addressing collection of pet waste, and especially minimizing the nuisance that disposing of such waste poses to human owners, are available in the market place. Litter boxes filled with granular, absorbent materials, in particular, have been commonly proposed as a solution for cat-owners due to cats' natural tendency to excrete in materials that enable them to instinctually bury their notoriously odiferous excrement. Although containing pet waste may be a relatively simple matter for this reason, eliminating the smell of pet waste from human living spaces or homes in general remains an elusive endeavor.

Some solutions proposed for masking offensive smells contained in litter boxes include, for example, incorporating odor-absorbing material into the composition of the granular litter material itself. Some have additionally or alternatively fashioned hooded litter boxes for physically containing noxious odors, however, some cats refuse to use hooded litter boxes because the stench contained therein can be over-powering even to them. Even where the cat is indifferent to the scent of its own excrement, it is difficult to prevent the smell from exiting the confined space of the hooded litter box through openings designed to permit ingress by the cat.

Some ventilated litter boxes have been proposed, as listed above, to aerodynamically remove noxious odors from within the litter boxes, however, such proposals are also deficient for various reasons. For instance, some proposals simply mix the noxious odors in a litter box with clean air in the owner's living space, which decreases the concentration of the noxious odors by diluting them into the area defined by the owner's living space. Other proposals require that pet owners add holes in their walls to access existing HVAC lines and may be otherwise difficult to implement widely due to the generally unique arrangement of and limitations defining features that comprise each owners' home.

Thus, there remains a need for an improved litter box that is universally disposable in owners' homes.

SUMMARY

The present disclosure is directed to devices and kits configured to displace noxious odors generated by pet waste or excrement from within receptacles kept in a pet owner's living space to areas existing outside of such owner's living space. More particularly, means for electrically ventilating receptacles such as litter boxes are provided to universally direct noxious odors outside though a window existing in the human living space or home while minimizing any effect that such means may have on the window's insulating properties, regardless of the size of the particular window.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, a universal ventilated litter box assembly comprises an enclosure configured for discreet animal excretion. One such enclosure may be a hooded litter box commonly used by cats, rabbits, and other small house pets. For example, the enclosure may comprise a water tight tray having a solid bottom portion as well as a sidewall that extends upward from the bottom portion terminating in a top edge. In practice, any type of granular material, including natural and synthetic sand and clay, plant-based biodegradable products, silica gel, and diatomaceous earth, among other absorbent materials, may be placed in the water tight tray to absorb pet excretions. In some cases, these may be mixed or otherwise used in conjunction with additional deodorizing materials.

A hood may also be provided which has a top portion and a sidewall extending downward from the top portion terminating in a bottom edge. It is contemplated that at least one of the top edge and bottom edge are formed as a flange that enables such top and bottom edges to securely nest with one another. Of course, one skilled in the art will recognize that the top and bottom edges may be formed as complementary nestable flanges, and may even comprise means for lockably securing the hood and tray to one another to prevent accidental separation of such parts.

An opening sized to permit ingress and egress by a pet may be disposed on any portion of the hood. For example, the opening may be placed on a portion of the sidewall of the hood in a manner similar to a door, providing a pet with relatively easy access to a space designated for its excretion. However, one skilled in the art will recognize that it may be desirable to dispose the opening on a top portion of the hood, such as for example, to prevent small children from easily accessing unhygienic contents of the enclosure. Thus the particular placement of the opening should not limit the invention.

An exhaust opening configured to fluidly communicate with a duct may also be disposed on the enclosure. For example, in one embodiment, the exhaust opening may be disposed on any of the sidewall and top portion of the hood. The duct itself may comprise rugged and flexible material chosen from, for example only and not limitation, any of PVC, polyester, vinyl, neoprene, silicon, natural and/or synthetic rubber, and other suitable material. In some embodiments, the duct may comprise an expandable accordion hose, however, it is also contemplated that the duct may take other convenient forms, such as a sheet-metal tube and the like.

A tube adaptor and/or other suitable means such as tape, clips, and even screws known to those skilled in the art, may be provided to securely join an end of the duct to the exhaust opening. In some embodiments, placement of the exhaust opening on the enclosure may be chosen to prevent a pet or even human from tampering with the device. For example, it may be desirable to place the exhaust opening on or near the top portion of the hood so that the connection of the exhaust opening and duct may be vertically out of reach of a curious pet. As another example, it may be desirable to place the exhaust opening along a bottommost portion of the sidewall of the hood so that an end of the duct may be aesthetically disposed near to the ground. These optional placements are of course offered by way of example only, and not of limitation.

A ventilation fan such as a cylindrical duct fan may be sealedly mated with another end of the duct to draw air from within the enclosure, through the exhaust opening, and through the duct.

The fan may be matedly secured in any end of the duct, however, it is contemplated that, in some embodiments, the fan may be placed apart from the enclosure to prevent a pet from tampering with or even becoming disturbed by the close proximity of the fan. Next, the fan may be concurrently matedly secured in an expandable window vent panel so that noxious odors may be finally directed from within the enclosure to an outside of the pet owner's living space.

It is contemplated that the window vent panel may be configured to sealedly nest in any convenient window in a pet owner's living space. More particularly, in an embodiment, the window vent panel may comprise a first portion and a second portion that are slideably, adjustably, and securably mateable with one another to be securely nested in a portion of a window frame of any height or width. For example, the length of the window vent panel may be expanded or shortened as needed to fit in a longer or shorter window frame, respectively. Indeed, the window vent panel may even be disposed horizontally or vertically as needed, depending on whether the window is configured to open vertically or horizontally.

An additional exhaust opening may be disposed on either one of the first and second portions to sealedly and matedly receive the fan therein. The window vent panel may be configured to at least minimize compromising insulating properties of the window. For instance, the first and second portions of the window vent panel may comprise non-porous, insulating plastic. Possible materials comprising the window vent panel may include, for example and not limitation, acrylic, polystyrene, polyethelyne, vinyl, and many other possible materials known to those skilled in the art. Additionally, any seams existing between the exhaust opening and fan, the window vent panel and window and window frame, and even the first and second portions of the window vent panel may be further insulated or sealed with materials such as natural or synthetic rubber insulating tape. Thus, it may be seen that the foregoing is offered merely to explain a possible construction without limiting the invention.

In some embodiments, the fan may be electrically powered and as such may comprise any power source known to those skilled in the art. For instance, the power source may be a power cord mateable with a power outlet existing in a pet owner's home. The power source may be a battery pack. Other features are also contemplated. For example, the fan may comprise motion sensors which cause the fan to operate and ventilate the enclosure when a pet enters or exists such enclosure. The fan may also comprise a timer switch which causes the fan to automatically cease operation after a predetermined period of time.

In some embodiments, the present invention may provide for one or more perforations in the hood to increase the flow of fresh air into the assembly when the fan is switched on.

Thus, a flexible, elongated duct may be coupled to an exhaust hole in any hooded litter box on one end, and on another end, coupled to an electrically powered fan and universal window vent panel. When the window vent panel is sealedly disposed in a window and the fan is powered on, noxious air within the receptacle may be drawn through the exhaust opening in the enclosure, the duct, and the exhaust opening in the window vent panel to an outside of such window.

Thus, it is an object of the invention to remove unpleasant and even noxious odors from a pet waste receptacle such as a litter box.

It is another object of the invention to aerodynamically direct unpleasant and even noxious odors from a pet waste receptacle such as a litter box stored in human living space to an outside of such space.

It is still another object of the invention to provide a ventilated pet waste receptacle such as a litter box that is universally disposable in pet owners' homes.

One or more of the above-disclosed embodiments, in addition to certain alternatives, are provided in further detail below with reference to the attached figures. The disclosed subject matter is not, however, limited to any particular embodiment disclosed.

Figure 1:
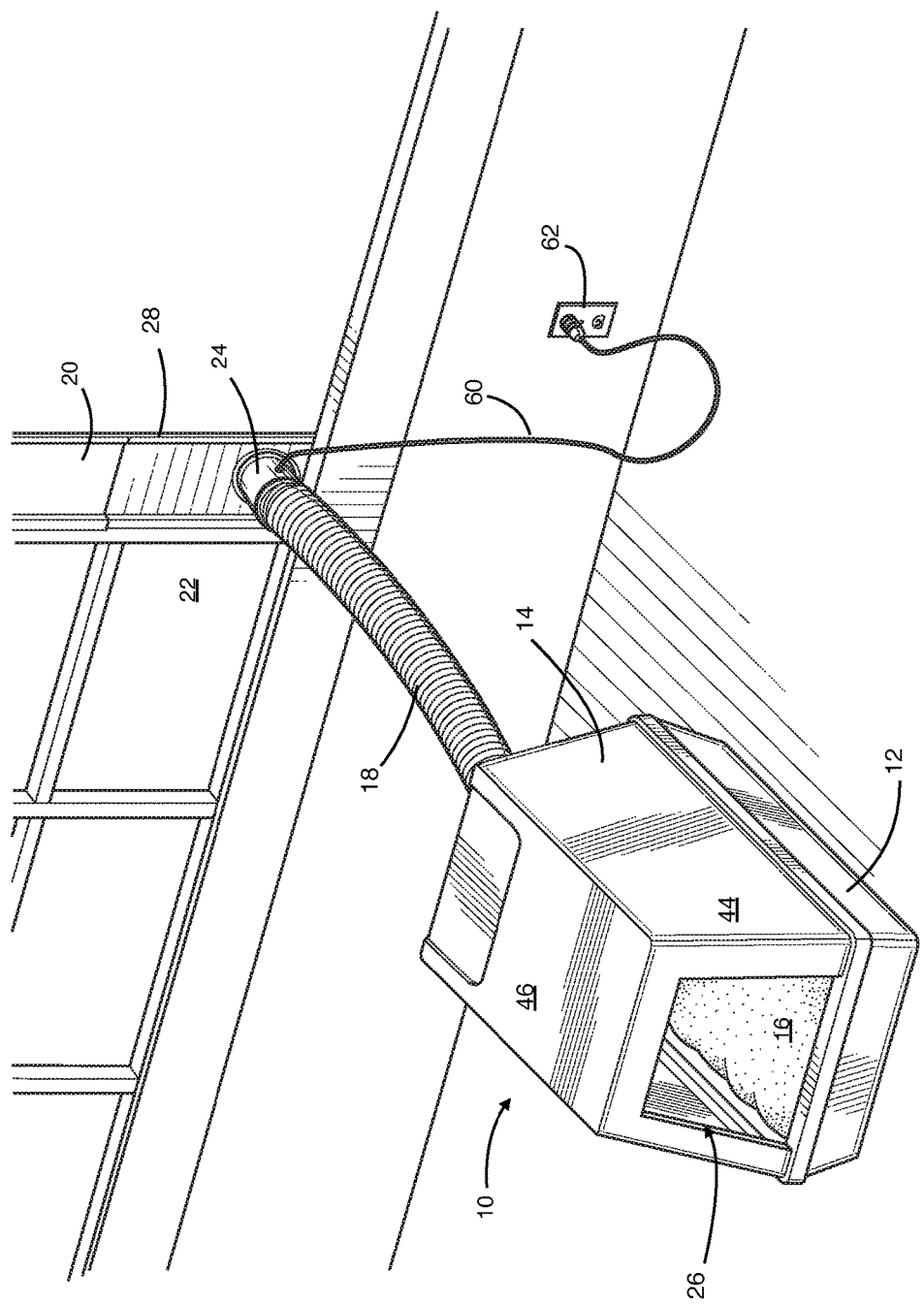
FIG. 1 shows a perspective view of an embodiment of a ventilated litter box assembled in a window.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to FIG. 1, one embodiment of a universal ventilated litter box assembly comprises an enclosure 10 having a tray 12 and a hood 14. Any absorbent litter product, such as for example natural or synthetic granulated clay 16 or crystals or even biodegradable material, may be disposed in the tray 12. An elongated duct 18 may be coupled to the enclosure 10 and further coupled to a window vent panel 20 that is adjustably disposable in any open space in an existing window 22 frame. A fan 24 may also be coupled along any portion of the duct 18 to draw odiferous air contained in the enclosure 10 through the window vent panel 20 so that it is displaced from an inside of a pet owner's home to an outside of the home.

Figure 2:
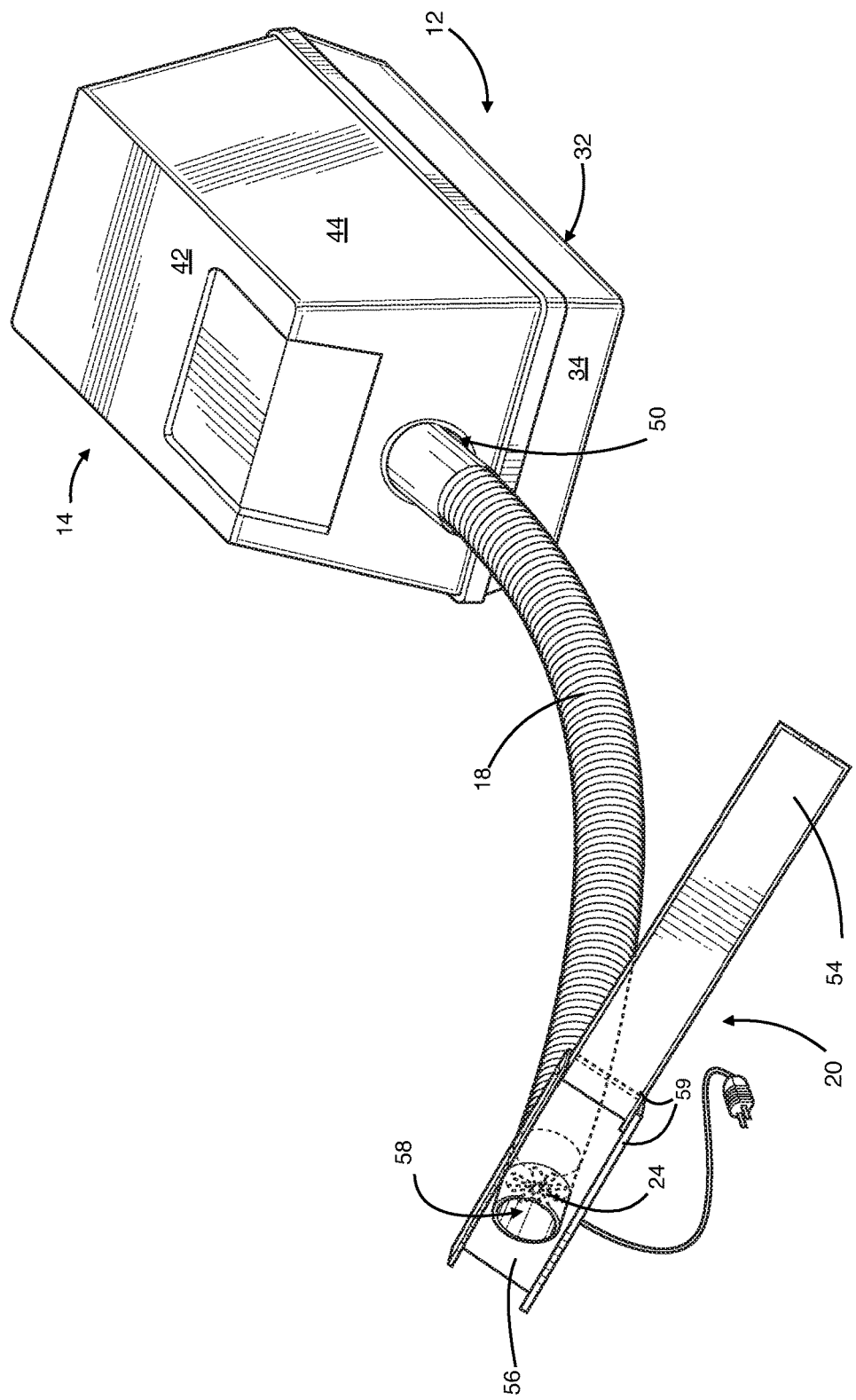
FIG. 2 shows a perspective view of an embodiment of a ventilated litter box assembly.
Figure 3:
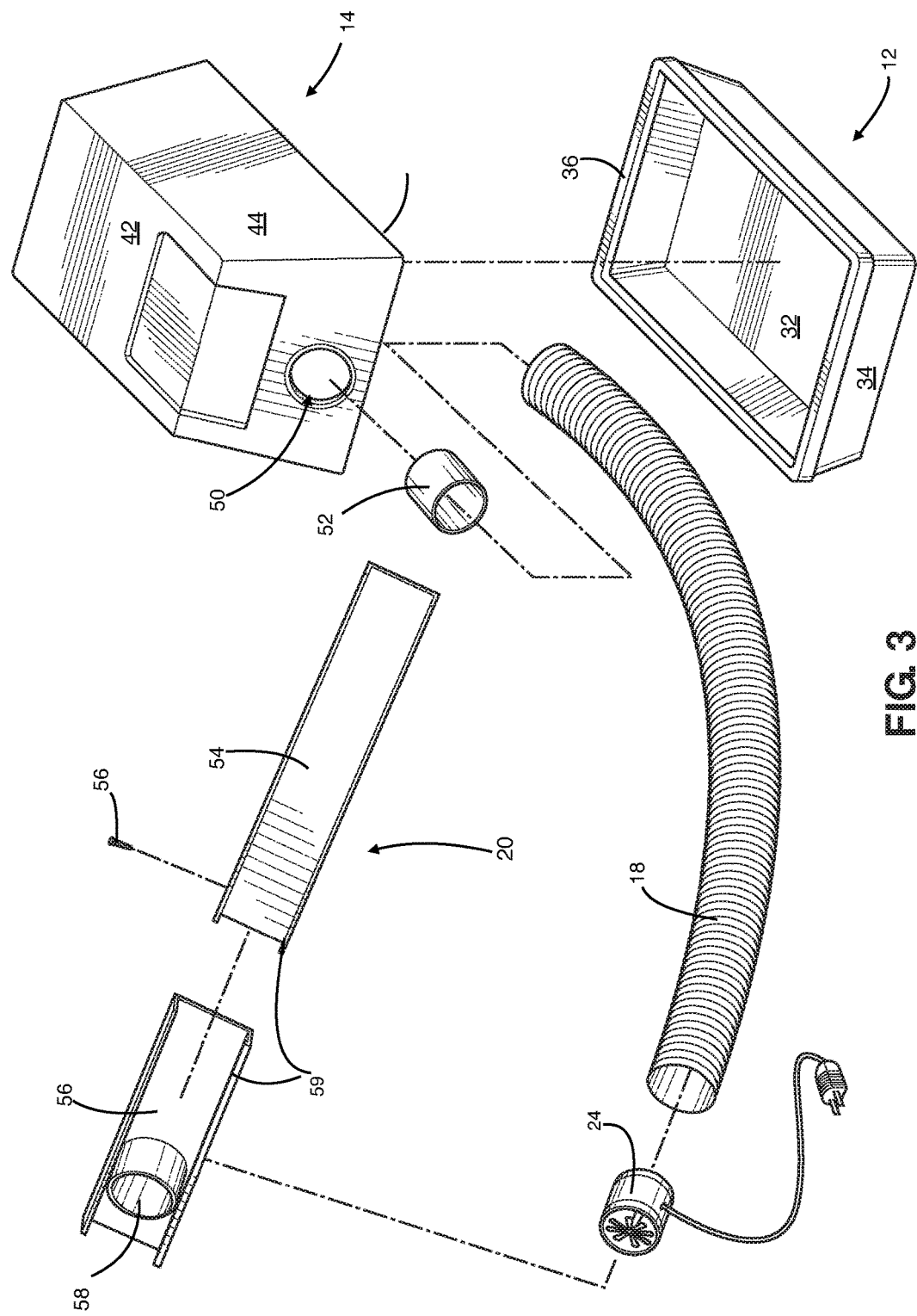
FIG. 3 shows an exploded view of an embodiment of a ventilated litter box assembly.

With more particularity and reference to FIGS. 2 and 3, the tray 12 of the enclosure 10 may have having a non-porous bottom portion 32 as well as a sidewall 34 that extends upward from the bottom portion 32 terminating in a top edge 36.

The hood 14 may comprise a top portion 42 and a sidewall 44 extending downward from the top portion 42 terminating in a bottom edge 46. In some embodiments, one or both of the top edge and bottom edge of the respective tray and hood may be formed as a flange that enables such top and bottom edges to securely nest with one another. Of course, one skilled in the art will recognize that the top and bottom edges 36, 46 may be formed as complementary nestable flanges, and may even comprise means for lockably securing the tray 12 and hood 14 to one another to prevent accidental separation of such parts. Thus, although the figures illustrate the top edge 36 of the tray 12 as a flange, it is contemplated that the bottom edge 46 of the hood 14 may alternatively or even additionally formed as a flange as well. Furthermore, the tray 12 and hood 14 are drawn as having polygonal sidewalls 34, 44 and top and bottom portions 32, 42, however, one skilled in the art will recognize that many shapes and configurations are possible. As only one of many possible alternatives, the sidewalls 34, 44 may be smooth rather than angular. As such, the figures should not be seen to limit the particular form of various elements comprising the invention.

Referring briefly to FIG. 1, an opening 26 sized to permit ingress and egress by a pet may be disposed on any portion of the hood 14. Though shown as disposed on a portion of the sidewall 44 of the hood, it is contemplated that the opening may alternatively be disposed on the top portion 42. Thus, one skilled in the art will recognize that access to the litter 16 contained in the enclosure 10 may be granted in various manners to a pet, and particular placement of the opening 26 should not limit the invention.

Returning to FIG. 3, an exhaust opening 50 may also be disposed on the hood 14. As with the pet opening, the exhaust opening 50 may be placed on any portion of the hood 14, though it is illustrated as being disposed on the sidewall 44 of the hood 14. Such exhaust opening 50 may be provided and configured to fluidly communicate with the duct 18.

The duct 18 itself may comprise rugged and flexible material chosen from, for example only and not limitation, any of PVC, polyester, vinyl, neoprene, silicon, natural and/or synthetic rubber, and other suitable material. In some embodiments, the duct 18 may comprise an expandable accordion hose, such as that illustrated, however, it is also contemplated that the duct 18 may take other convenient forms, such as a sheet-metal tube and the like. It is contemplated that providing the duct 18 as an elongated, flexible hose may enable pet owner's to adapt placement of the duct 18 to their own personal home environment. For example, the duct 18 may be resiliently bent to run beneath or around fixtures and/or furniture possibly obstructing direct access to a window in the home. As another example, the duct 18 may be resiliently and flexibly arranged to avoid detracting from any aesthetic aspects of the home.

Means for coupling an end of the duct 18, such as a tube adaptor 52 may be provided to securely join an end of the duct 18 to the exhaust opening 50. In some embodiments, such means may alternatively or even additionally comprise tape, clips, and even screws known to those skilled in the art.

Next, the fan 24 may be couplable to a portion of the duct 18. To achieve this, the fan 24 may be a cylindrical duct fan known in the art to draw air from within the enclosure, through the exhaust opening 50, and through the duct 18. Though the fan 24 may be matedly secured in any end of the duct 18, it is contemplated that, in some embodiments, the fan may be placed apart from the enclosure to prevent a pet from tampering with or even becoming disturbed by the close proximity of the fan 24. Thus, the figures show that the fan 24 may be disposed in the duct 18 in a position that is opposite from the exhaust opening 50 in the hood 14. This distances the fan 24 from a pet using the litter box, avoiding disrupting the pet's comfort or inclination to discreetly use the box.

The fan 24 may also be matedly secured in the expandable window vent panel 20 so that noxious odors may be finally directed from within the enclosure to an outside of the pet owner's living space. An additional exhaust opening 58 may be provided to sealedly and matedly receive the fan 24 therein, as shown in FIGS. 2 and 3.

In one embodiment, the window vent panel 20 may comprise a first portion 54 and a second portion 56 that are slideably, adjustably, and securably mateable with one another. For instance, the first and second portions 54, 56 of the window vent panel 20 may comprise nesting rails 59 which prevent the first and second portions 54, 56 from separating from one another when disposed in a window frame. Still, the first and second portions 54, 56 may slide with respect to one another so as to be securely nestable in any window frame regardless of the particular dimensions of the window. This enables universal application of the ventilated litter box assembly in various homes and living spaces. Indeed, the window vent panel 20 may even be disposed horizontally or vertically as needed, depending on whether the window is configured to open vertically or horizontally. It may be seen that additional means for adjustably locking the window vent panel 20 in a desirable length may be provided. For example, a pin 56 may be used to join the first and second portions of the window vent panel 20.

In some embodiments, it is contemplated that the window vent panel 20 may be configured to at least minimize compromising insulating properties of the window including a venting panel. This is because a window must typically be opened to receive a window vent panel. In some embodiments, the first and second portions 54, 56 of the window vent panel 20 may comprise non-porous, insulating plastic. Possible materials comprising the window vent panel may include, for example and not limitation, acrylic, polystyrene, polyethelyne, vinyl, and many other possible materials known to those skilled in the art. Additionally, with reference again to FIG. 1 any seams existing between the exhaust opening 50 and fan 24, the window vent panel 20 and window 22 and window frame 28, and even the first and second portions of the window vent panel 20 may be further insulated or sealed with materials such as natural or synthetic rubber insulating tape.

In some embodiments, the fan 24 may be electrically powered and as such may comprise any power source known to those skilled in the art. For instance, the power source may be a power cord 60 mateable with a power outlet 62 existing in a pet owner's home. The power source may alternatively or optionally be a battery pack. Other features are also contemplated, though. For example and not limitation, the fan 24 or even enclosure 10 may comprise motion sensors which cause the fan 24 to operate and ventilate the enclosure 10 when a pet enters or exists such enclosure 10. The fan 24 may also be communicatively linked with a timer switch which causes the fan 24 to automatically cease operation after a predetermined period of time.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, an opening for enabling ingress and egress by a pet may be disposed on any side or top portion of the litter box. Additionally, the size and shape of the litter box may vary according to any number of aesthetic and functional desires. For example, an aesthetic design may be chosen to coordinate with particular home décor or even according to a pet owner's taste, and the dimensional size of the litter box may be chosen to accommodate cats of particular sizes. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the universal ventilated litter box assembly with which that terminology is associated. In general, the terms used in the following claims should not be constructed to limit the universal ventilated litter box assembly to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the universal ventilated litter box assembly is not intended to be exhaustive or limited to the precise form disclosed above or to a particular field of usage.

While specific embodiments of, and examples for, the apparatus are described above for illustrative purposes, various equivalent modifications are possible for which those skilled in the relevant art will recognize.

While certain aspects of the apparatus disclosed are presented below in particular claim forms, various aspects of the apparatus are contemplated in any number of claim forms. Thus, the inventor reserves the right to add additional claims after filing the application to pursue such additional claim forms for other aspects of the universal ventilated litter box assembly.

What is claimed is:

1. A universal ventilated litter box, comprising:
   an enclosure;
   an opening sized to permit ingress and egress by a pet disposed on the enclosure;
   an exhaust opening disposed on a sidewall of the enclosure;
   a flexible, elongated duct defining an expandable accordion hose having a first end and a second end;
   means for securing the first end of the duct in the exhaust opening disposed in the sidewall of the enclosure;
   a cylindrical terminal exhaust opening element configured to removably receive the second end of the duct;
   an optionally expandable window vent panel configured to universally and sealedly nest in an open portion of a window, comprising a first portion slideably mateable with a second portion and an exhaust opening disposed on one of the first and second portions, wherein the exhaust opening is sized to surround the cylindrical terminal exhaust opening element; and
   an electrical fan disposed within the exhaust opening in the window vent panel;
   wherein, when the fan is electrically powered on, air within the enclosure is drawn through exhaust opening in the enclosure, the duct, and the exhaust opening in the window vent panel to an outside of such window.

2. The litter box of claim 1, wherein the enclosure comprises:
   a watertight tray having a solid bottom portion and a sidewall extending upward from the bottom portion, the sidewall of the tray terminating at a top edge formed as a flange; and
   a hood having a top portion and a sidewall extending downward from the top portion, the sidewall of the hood terminating at a bottom edge formed as a flange securely nestable with the flange of the watertight tray.

3. The litter box of claim 2, wherein the opening sized to permit ingress and egress by a pet is disposed on any of the top portion and sidewall of the hood.

4. The litter box of claim 1, wherein the exhaust opening is disposed on any of the top portion and sidewall of the hood.

5. A kit comprising:
   a watertight tray having a solid bottom portion and a sidewall extending upward from the bottom portion, the sidewall of the tray terminating at a top edge formed as a flange;
   a hood having a top portion and a sidewall extending downward from the top portion, the sidewall of the hood terminating at a bottom edge formed as a flange securely nestable with the flange of the watertight tray, an opening disposed in any of the top portion and sidewall to permit ingress and egress of a pet, and an additional exhaust opening disposed in the sidewall;
   a flexible, elongated duct having a first end and a second end;
   means for securing the first end of the duct in the exhaust opening disposed in the enclosure;
   a cylindrical terminal exhaust opening element configured to removably receive the second end of the duct;
   an optionally expandable window vent panel configured to universally and sealedly nest in an open portion of a window, comprising a first portion slideably mateable with a second portion and an exhaust opening sized to surround the cylindrical terminal exhaust opening element disposed on one of the first and second portions;
   means for maintaining the window vent panel at a selected length; and
   an electrical fan mated with the exhaust opening in the window vent panel.

* * * * *